(12) United States Patent
Koring

(10) Patent No.: US 11,999,283 B1
(45) Date of Patent: Jun. 4, 2024

(54) ROOF-MOUNTED PULLEY MECHANISM

(71) Applicant: Mark Koring, Greensburg, PA (US)

(72) Inventor: Mark Koring, Greensburg, PA (US)

(*) Notice: Subject to any disclaimer, the term of this patent is extended or adjusted under 35 U.S.C. 154(b) by 0 days.

(21) Appl. No.: 17/950,410

(22) Filed: Sep. 22, 2022

(51) Int. Cl.
*B60P 1/54* (2006.01)

(52) U.S. Cl.
CPC .................. *B60P 1/5452* (2013.01)

(58) Field of Classification Search
CPC ............... B60P 1/5419; B60P 1/5452
USPC ........................................ 414/543
See application file for complete search history.

(56) References Cited

U.S. PATENT DOCUMENTS

| | | | | |
|---|---|---|---|---|
| 3,519,154 A | * | 7/1970 | Noble | B60P 3/1008 414/462 |
| 4,881,864 A | * | 11/1989 | Amato | B60R 9/06 254/323 |
| 5,460,472 A | | 10/1995 | Bamber | |
| 5,709,521 A | | 1/1998 | Glass et al. | |
| 6,138,991 A | * | 10/2000 | Myers, Jr. | B66C 23/44 212/180 |
| 6,634,529 B2 | | 10/2003 | Choiniere et al. | |
| 6,821,075 B2 | * | 11/2004 | van der Horn | B66C 23/44 414/543 |
| 6,981,834 B1 | * | 1/2006 | Henry | B60P 1/5471 212/299 |
| 7,070,059 B1 | * | 7/2006 | Flowers | B66C 23/44 414/921 |
| 7,513,730 B2 | | 4/2009 | Goyanko | |
| 7,878,484 B2 | * | 2/2011 | Kitchens, Sr. | B66C 23/701 254/326 |
| 8,231,325 B1 | * | 7/2012 | Walton | B60P 1/5466 414/543 |
| 8,479,933 B2 | * | 7/2013 | Vaquera | B66C 23/44 254/323 |
| 9,290,130 B2 | | 3/2016 | Buller | |
| 9,463,748 B2 | | 10/2016 | Presley | |
| 9,914,400 B1 | | 3/2018 | Johnsrud | |
| 10,040,402 B1 | | 8/2018 | Brusselback | |
| 10,286,853 B1 | | 5/2019 | Carbone et al. | |
| 10,343,581 B1 | | 7/2019 | Leonard | |
| 11,130,435 B2 | * | 9/2021 | Leonard | B66C 13/24 |

* cited by examiner

*Primary Examiner* — Jonathan Snelting
(74) *Attorney, Agent, or Firm* — Cramer Patent & Design PLLC; Aaron R. Cramer

(57) ABSTRACT

A roof-mounted pulley mechanism consists of a pulley and extendable crane secured upon a mount capable of being removably secured to a roof of an automobile. The crane is capable of swiveling upon the mount. The pulley is operated by a crank while a cable on the crane extends from a spool and has a hook at a distal end of the cable. A user may operate the roof-mounted pulley mechanism to load and unload packages and materials into an automobile.

1 Claim, 5 Drawing Sheets

ROOF-MOUNTED PULLEY MECHANISM

FIELD OF THE INVENTION

The presently disclosed subject matter is directed to a pulley mechanism and more specifically to a roof-mounted pulley mechanism.

BACKGROUND OF THE INVENTION

There are many times when a heavy object must be lifted and typical aides such as cranes, tow motors, tow trucks or the like are not available or feasible. Examples of these tasks are the lifting of loads into or out of cars such as lawnmowers, or even heavier objects out of pickup or delivery trucks. In many instances, the enlisting of help of friends, neighbors or family is not possible, or even if they area, they may not be physically capable or willing to help.

Should the lifting task proceed without assistance, damage or injury to the user, the load, or the vehicle is a likely result. Accordingly, there exists a need for a means by which heavy loads can be lifted in and out of various types of vehicles to address the need as described above. The development of the roof-mounted pulley mechanism fulfills this need.

SUMMARY OF THE INVENTION

The principles of the present invention provide for a vehicle-mounted lifting device has a round base frame which utilizes a plurality of connecting arms to attach to a rotating bearing, a main boom which is attached to the rotating bearing at a right angle, a first brace and a second brace which provides structural stability of a main mast in relation to the main boom, an auxiliary boom which fits within the main boom, a first pulley which is located on the main boom and the auxiliary boom, a second pulley which is equipped with a lifting hook attached to one of the first pulleys by a cable, a crank apparatus which moves the cable to lift the second pulley and the lifting hook along a lifting travel path, a strap which attaches the vehicle-mounted lifting device to a structural element for stability and an engagement lever which pivots upon a bearing pin allowing for one-way locking of a geared wheel and thus a reel. The auxiliary boom moves along a deployment path which is provided by a pivot point. The crank apparatus includes a mounting plate.

The rotating bearing may allow the one or more parcels to be loaded into one or more openings of a vehicle. The one or more parcels may be loaded into a trunk of the vehicle. The round base frame may be securely fastened to a roof area of the vehicle by a series of fasteners. The fasteners may be selected from the group consisting of a plurality of ratcheting straps, a plurality of clamps, a plurality of bolts, or a plurality of cargo rack attachments.

Excess cable from the cable may be wound upon the reel provided with a hand crank and a ratcheting locking mechanism. The ratcheting locking mechanism may include the geared wheel mounted on a shaft. The reel, housing the cable, may be mounted along the shaft which terminates at a nut and is held captive with the nut. The rotating bearing may allow for a 360-degree travel path of the main mast and the main boom. The second pulley and the lifting hook may be positioned at the first pulley of the auxiliary boom. The vehicle-mounted lifting device may provide for lifting one or more parcels into and out of the vehicle.

The vehicle may be a motor vehicle selected from the group consisting of a sedan, an SUV, a pick-up truck, a box truck, or a van. The vehicle-mounted lifting device is installed for each lifting process while the vehicle is in process. The second pulley and the first pulley allow both to lift as generated by the crank apparatus. The vehicle-mounted lifting device may be left in place while the vehicle is in process. A spreader bar used with a sling to lift the one or more parcels. The vehicle-mounted lifting device may be made of steel.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
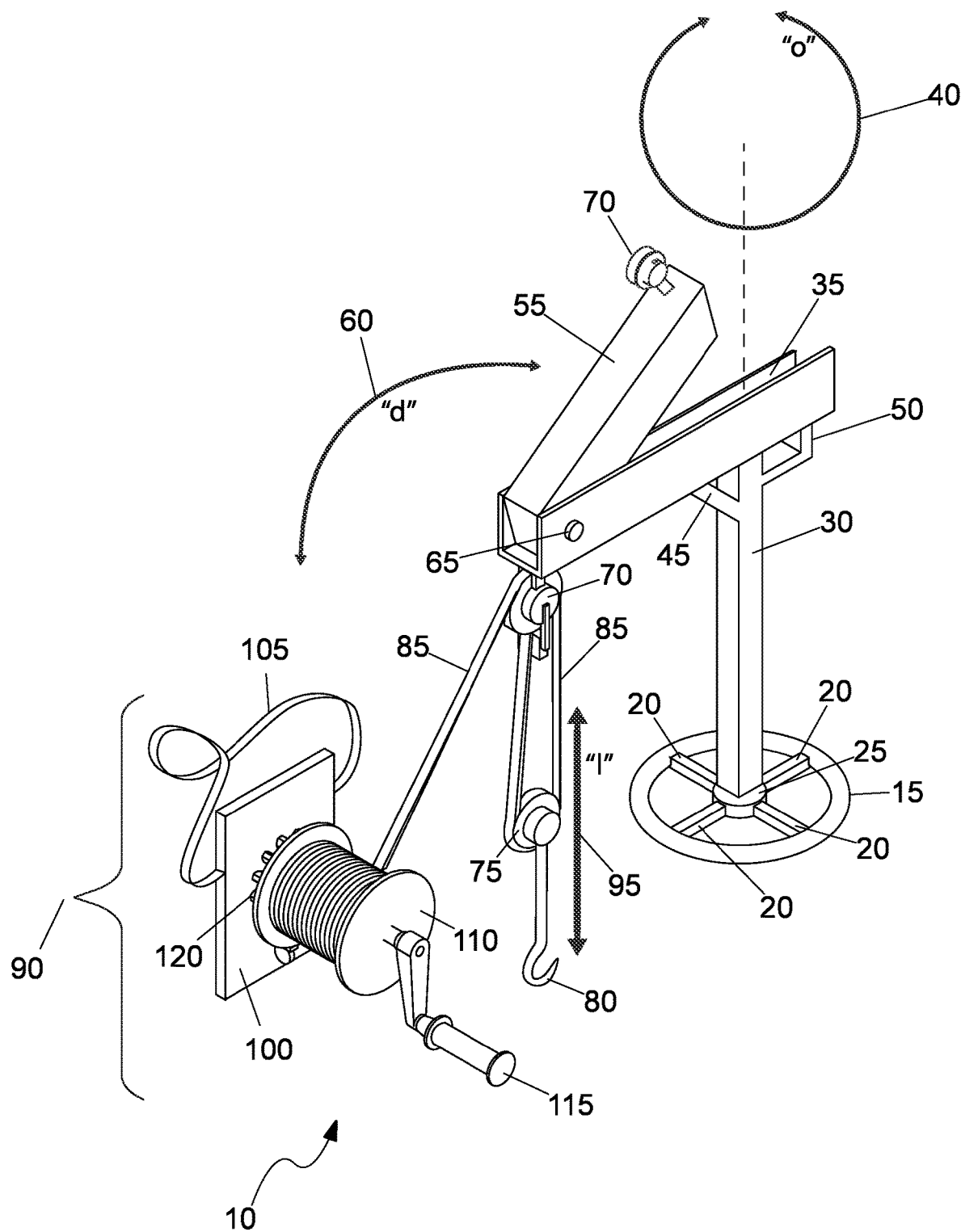
FIG. 1 is a perspective view of the vehicle-mounted lifting device, according to the preferred embodiment of the present invention.

DESCRIPTIVE KEY 10 vehicle-mounted lifting device
15 round base frame
20 connecting arm
25 rotating bearing
30 main mast
35 main boom
40 travel path "o"
45 first brace
50 second brace
55 auxiliary boom
60 deployment path "d"
65 pivot point
70 first pulley
75 second pulley
80 lifting hook
85 cable
90 crank apparatus
95 lifting travel path "1"
100 mounting plate
105 strap
110 reel
115 hand crank
120 ratcheting locking mechanism
125 motor vehicle
130 spreader bar
135 sling
140 parcel
145 rear passenger area
150 trunk 155 roof area
160 fasteners
165 grade
170 trunk interior
175 shaft
180 bearing
185 nut
195 geared wheel
200 engagement lever
205 bearing pin
210 hand grip

Description of the Preferred Embodiments

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the vehicle-mounted lifting device 10, according to the preferred embodiment of the present invention is disclosed. The vehicle mounted lifting device 10 (herein also described as the "device") 10, provides for the lifting of parcels 140 into and out of various types of motor vehicles 125 including, but not limited to: sedans, SUV's pickup trucks, box trucks, vans, and the like. The device 10 includes a round base frame 15 which utilizes four (4) connecting arms 20 to attach to a rotating bearing 25. A main mast 30 is physically attached to the rotating bearing 25 with a main boom 35 arranged at a right angle. The rotating bearing 25 allows for a 360-degree) (360° travel path "o" 40 of the main mast 30 and main boom 35. A first brace 45 and a second brace 50 provide for structural stability of the main mast 30 with relation to the main boom 35. An auxiliary boom 55 fits within the main boom 35 and moves along a deployment path "d" 60 as provided by a pivot point 65. Both the main boom 35 and the auxiliary boom 55 are provided with a first pulley 70. A second pulley 75 equipped with a lifting hook 80 is physically attached to one of the first pulleys 70 by a cable 85. Movement of the cable 85 by a crank apparatus 90 allows for lifting of the second pulley 75 and the lifting hook 80 along a lifting travel path "1" 95. The double pulley arrangement of the second pulley 75 along with either of the first pulley 70 allow for a doubling of lifting power as generated by the crank apparatus 90. The crank apparatus 90 provides for a mounting plate 100. A strap 105 allows for attachment to a suitable structural element. The excess cable 85 is wound upon a reel 110 provided with a hand crank 115 and a ratcheting locking mechanism 120.

It is envisioned that all of the components of the device 10 would be made of steel for strength. The various components would be cut from steel stock shapes according to a master pattern and attached where appropriate using welding, fasteners, or suitable attachment methods. While the exact dimensions may vary and are not a limiting factor of the present invention, a typical version will be approximately three feet (3 ft.) wide and three feet (3 ft.) tall, with larger versions for larger motor vehicles 125, such as trucks, and smaller versions for smaller motor vehicles 125, such as compact cars.

Figure 2:
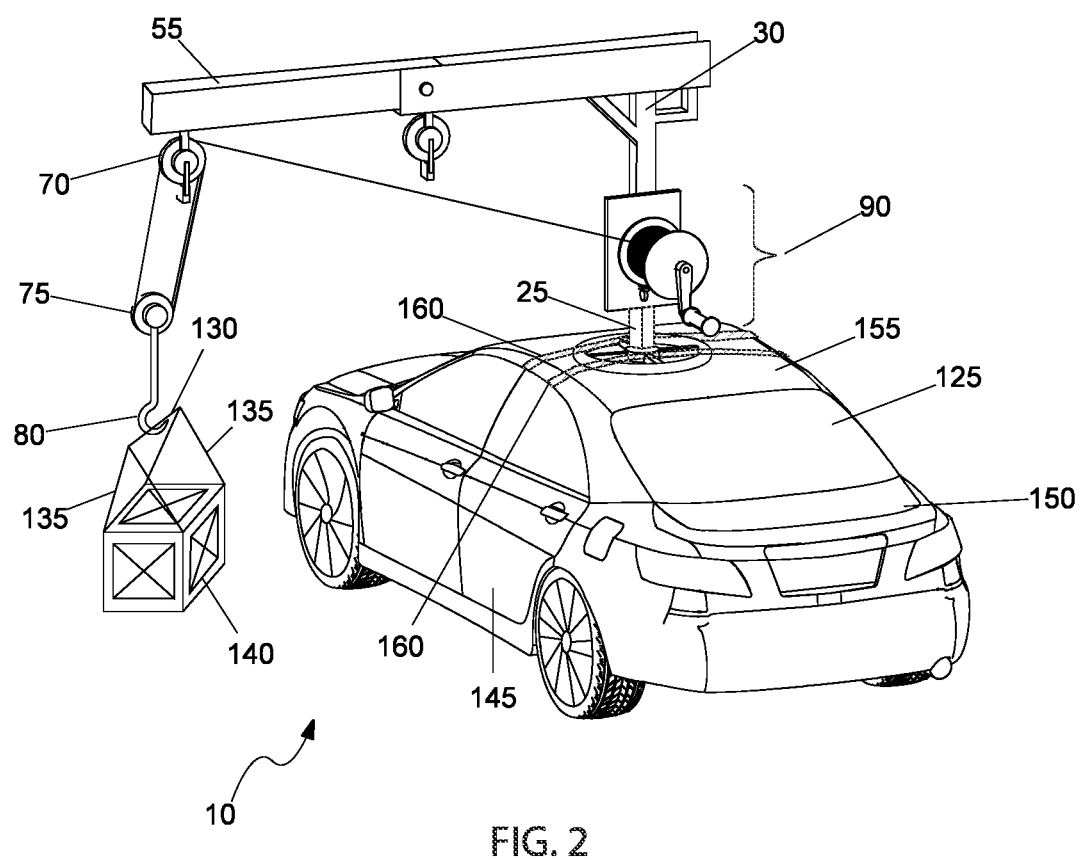
FIG. 2 is a perspective view of the vehicle-mounted lifting device, shown in an installed state on a motor vehicle, according to the preferred embodiment of the present invention.

Referring next to FIG. 2, a perspective view of the device 10, shown in an installed state on a motor vehicle 125, according to the preferred embodiment of the present invention is depicted. The motor vehicle 125 is depicted as a sedan for purposes of illustration. However, other types of vehicles including SUV's pickup trucks, box trucks, vans, and the like, can benefit from the teachings of the present invention. The second pulley 75 and the lifting hook 80 are positioned at the first pulley 70 of the auxiliary boom 55. A spreader bar 130 is used with a sling 135 to lift a parcel 140 in the typical manner. Once lifted by the crank apparatus 90, here fastened to the main mast 30 by the strap 105 (as shown in FIG. 1), the rotating nature of the rotating bearing 25 allows the parcel 140 to be loaded into various openings of the motor vehicle 125 such as the rear passenger area 145, the trunk 150. Other openings such as the cargo area, bed area, roof rack area, or the like may also be used as well depending on the type of motor vehicle 125. The round base frame 15 is securely fastened to the roof area 155 of the motor vehicle 125 by a series of fasteners 160 such as ratcheting straps, clamps, bolts, cargo rack attachments, or the like. The exact method of attachment to the motor vehicle 125 is not intended to be a limiting factor of the present invention. The lifting action afforded by the device 10 can be used to lift parcel 140 in or out of the motor vehicle 125 as needed.

Figure 3:
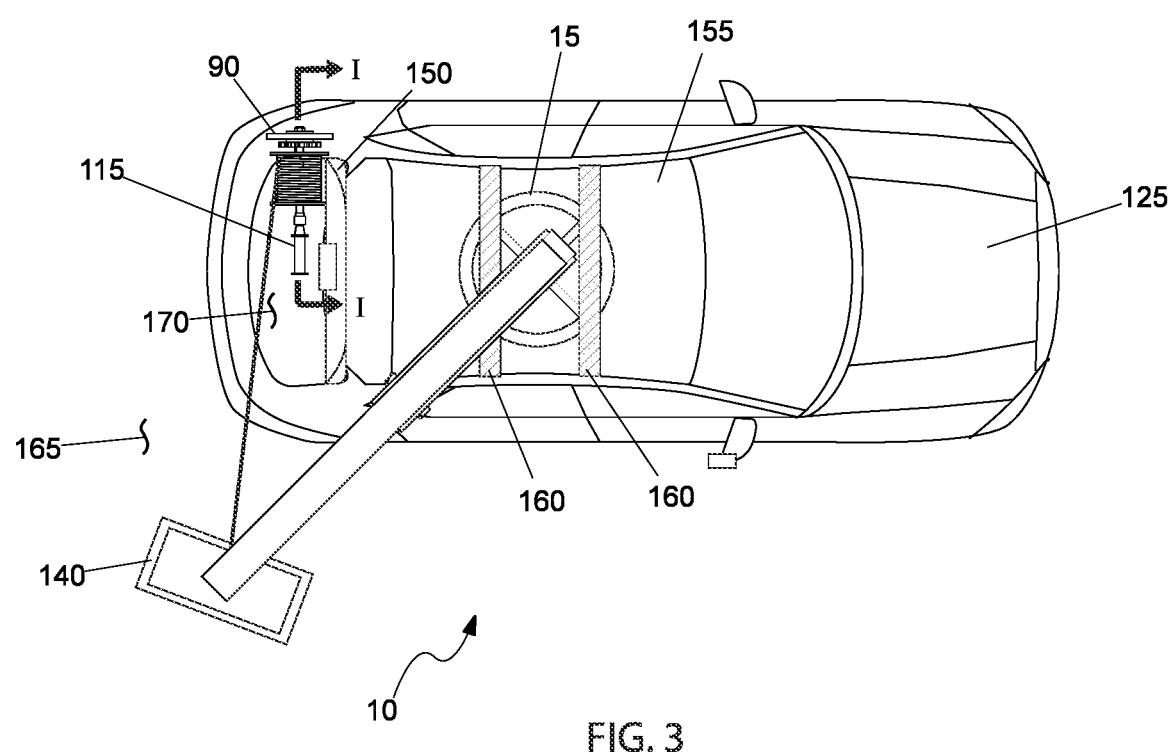
FIG. 3 is a top view of the vehicle-mounted lifting device, shown in an installed state on a motor vehicle according to the preferred embodiment of the present invention.

Referring now to FIG. 3, a top view of the device 10, shown in an installed state on a motor vehicle 125 according to the preferred embodiment of the present invention is shown. The device 10 is positioned to place a parcel 140 into the trunk 150, here shown in an open state. The crank apparatus 90 is positioned on the interior of the trunk 150 and fastened to a suitably structurally sound member of the motor vehicle 125. The user is able to manipulate the hand crank 115 to raise the parcel 140 from grade 165 to the trunk interior 170. The round base frame 15 is secured to the roof area 155 by the fasteners 160. Other possible locations for the device 10 on different styles of motor vehicles 125 include the bed of a pickup truck, the cargo area of an SUV, the roof of an SUV, the interior of a box truck, or the like.

Figure 4:
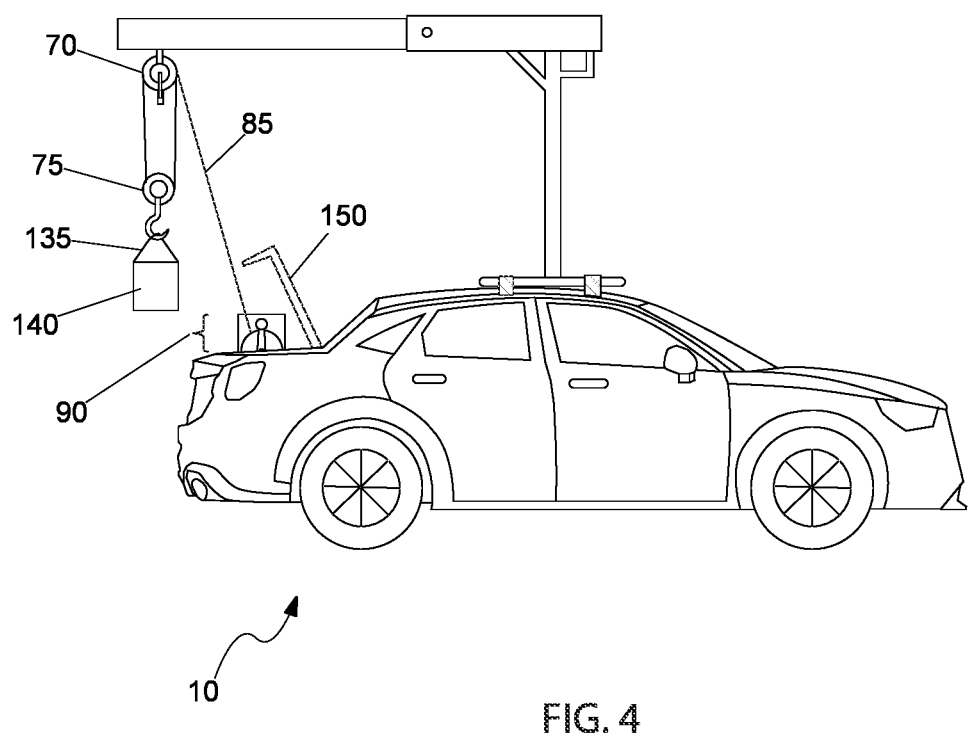
FIG. 4 is a side view of the vehicle-mounted lifting device, shown in a utilized state, according to the preferred embodiment of the present invention.

Referring next to FIG. 4, a side view of the device 10, shown in a utilized state, according to the preferred embodiment of the present invention is disclosed. The trunk 150 is shown in an open state allowing for the parcel 140 to be raised and manipulated by the crank apparatus 90, the first pulley 70, the second pulley 75, the cable 85 and the sling 135. The parcel 140, while be lowered, can be pushed inside of the trunk interior 170 with a minimum of effort. It is envisioned that the device 10 could be used by one (1) or more uses simultaneously. As with most manual physical labor, the addition of more users to assist in the lifting or lowering process will simplify the process resulting in easier use. The device 10 can be installed for each lifting process or can be left in place while the motor vehicle 125 is in process.

Figure 5:
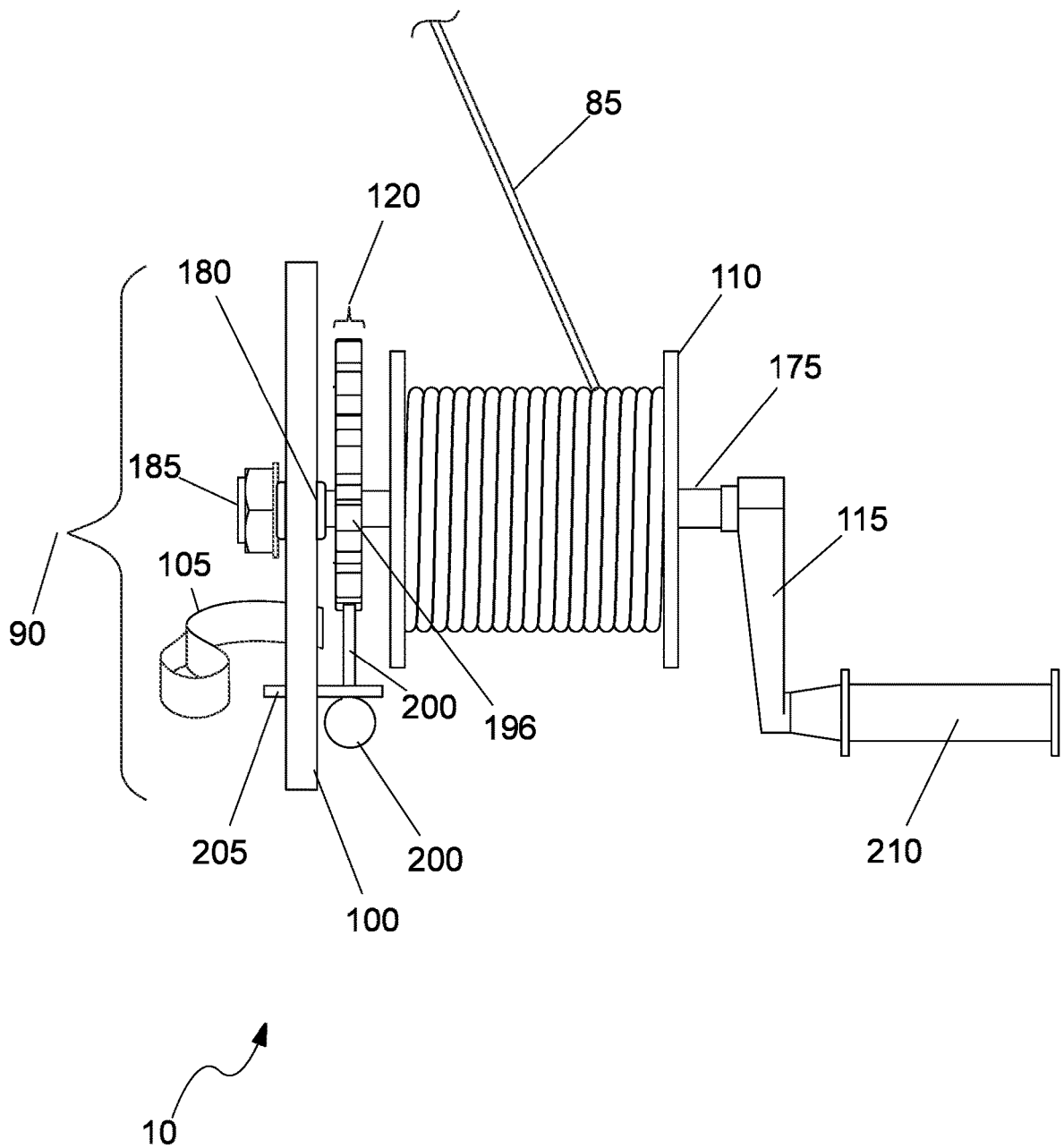
FIG. 5 is a sectional view of the vehicle-mounted lifting device as seen along a Line I-I, as shown in FIG. 3, according to the preferred embodiment of the present invention.

Referring finally to FIG. 5, a sectional view of the device 10 as seen along a Line I-I, as shown in FIG. 3, according to the preferred embodiment of the present invention is depicted. The crank apparatus 90 provides for the mounting plate 100 as aforementioned described. The strap 105 allows for the attachment of the mounting plate 100 to any suitable object. The reel 110, housing the cable 85, is mounted along a shaft 175 which terminates at a nut 185 and is held captive with a nut. The ratcheting locking mechanism 120 provides for a geared wheel 195, also mounted on the shaft 175. An engagement lever 200 pivots upon a bearing pin 205 and allows for the one-way locking of the geared wheel 195 and thus the reel 110. The hand crank 115 is provided with a hand grip 210 for non-slip and comfortable use.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the vehicle mounted lifting device 10 from conventional procurement channels such as hardware stores, home improvement stores, mechanical supply houses, mail order and internet supply houses and the like. Special attention would be paid to the overall size of the device 10 with respect on to which motor vehicle 125 it will be used with, overall reach of the main boom 35 and the auxiliary boom 55, and other physical parameters.

After procurement and prior to utilization, the device 10 would be prepared in the following manner: the device 10 would be placed on the roof area 155 or other suitable area of the motor vehicle 125; the fasteners 160 would be applied to hold the round base frame 15 in place; the crank apparatus 90 would be secured in a structurally suitable location; the second pulley 75 and the cable 85 would be applied to either of the two (2) first pulleys 70 as appropriate. At this point in time, the device 10 is ready for use.

During utilization of the device 10, the following procedure would be initiated: the necessary amount of cable 85 would be deployed to reach the parcel 140 or item to be lifted; necessary spreader bar 130 and/or sling 135 would be utilized to safely lift the parcel 140; the user would crank the hand crank 115 to lift the parcel 140 to a necessary height of the rear passenger area 145, the trunk 150, or other vehicle opening; the parcel 140 would be swung into position; the engagement lever 200 would be reversed and the hand crank 115 be manipulated to lower the parcel 140 into position.

After use of the device 10, it may then be removed or left in place depending on user preferences. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vehicle-mounted lifting device, comprising:
a round base frame utilizing a plurality of connecting arms to attach to a rotating bearing;
a main boom attached to the rotating bearing at a right angle;
a first brace and a second brace providing structural stability of a main mast in relation to the main boom;
an auxiliary boom fitting within the main boom, the auxiliary boom moves along a deployment path provided by a pivot point;
a first pulley provided on the main boom and the auxiliary boom;
a second pulley equipped with a lifting hook attached to the first pulley by a cable;
a crank apparatus moving the cable to lift the second pulley and the lifting hook along a lifting travel path, the crank apparatus includes a mounting plate;
a strap attaching the vehicle-mounted lifting device to a structural element for stability; and
an engagement lever pivoting upon a bearing pin allowing for one-way locking of a geared wheel and thus a reel and,
wherein the rotating bearing allows one or more parcels to be loaded into one or more openings of a vehicle;
wherein the one or more parcels are loaded into a trunk of the vehicle;
wherein the round base frame is securely fastened to a roof area of the vehicle by a series of fasteners;
wherein a plurality of fasteners are selected from the group consisting of a plurality of additional ratcheting straps, a plurality of clamps, a plurality of bolts, and a plurality of cargo rack attachments;
wherein excess cable from the cable is wound upon the reel provided with a hand crank and a ratcheting locking mechanism;
wherein the ratcheting locking mechanism includes the geared wheel mounted on a shaft wherein the reel, housing the cable, is mounted along the shaft which terminates at a nut and is held captive with the nut;
wherein the rotating bearing allows for a 360-degree travel path of the main mast and the main boom;
wherein the second pulley and the lifting hook are positioned at the first pulley of the auxiliary boom;
wherein the vehicle-mounted lifting device provides for lifting the one or more parcels into and out of a vehicle;
wherein the vehicle is a motor vehicle selected from the group consisting of a sedan, an SUV, a pick-up truck, a box truck, and a van;
wherein the vehicle-mounted lifting device is installed for each lifting process while the vehicle is in process;
wherein the second pulley and the first pulley allow both to lift the one or more parcels as generated by the crank apparatus;
wherein the vehicle-mounted lifting device is left in place while the vehicle is in process;
wherein a spreader bar used with a sling is used to facilitate the lifting of the one or more parcels; and,
wherein the vehicle-mounted lifting device is made of steel.

* * * * *